United States Patent
Nakano et al.

(10) Patent No.: US 6,808,207 B2
(45) Date of Patent: Oct. 26, 2004

(54) BOOT AND SEAT BELT DEVICE EMPLOYING THE SAME

(75) Inventors: Yoshiyuki Nakano, Shiga (JP); Masahiko Iwai, Shiga (JP)

(73) Assignee: Takata Corporation, Tokyo (JP)

( * ) Notice: Subject to any disclaimer, the term of this patent is extended or adjusted under 35 U.S.C. 154(b) by 143 days.

(21) Appl. No.: 10/119,743

(22) Filed: Apr. 11, 2002

(65) Prior Publication Data

US 2002/0158458 A1 Oct. 31, 2002

(30) Foreign Application Priority Data

Apr. 27, 2001 (JP) ........................................ 2001-131839

(51) Int. Cl.$^7$ ........................... B60R 22/195; F16J 15/52
(52) U.S. Cl. ....................... 280/806; 297/480; 297/482; 277/634; 277/636
(58) Field of Search ............................... 280/806, 801.1; 297/480, 482; 277/636, 634

(56) References Cited

U.S. PATENT DOCUMENTS

| | | | | |
|---|---|---|---|---|
| 1,293,607 A | * | 2/1919 | Dawson ..................... 277/634 |
| 3,041,885 A | * | 7/1962 | Christiansen ............... 277/636 |
| 4,826,466 A | * | 5/1989 | Triquet ....................... 277/634 |
| 5,027,665 A | * | 7/1991 | Hayward .................... 277/636 |
| 5,672,113 A | * | 9/1997 | Tomogami et al. ......... 277/636 |
| 5,725,249 A | * | 3/1998 | Nishide et al. ............. 280/806 |
| 6,042,092 A | * | 3/2000 | Shibata ....................... 267/122 |
| 6,357,795 B1 | * | 3/2002 | Krauss et al. ............... 280/806 |

FOREIGN PATENT DOCUMENTS

| DE | 295 17 741 | 2/1996 |
|---|---|---|
| EP | 1 266 808 | 12/2002 |
| GB | 2 261 267 | 5/1993 |

* cited by examiner

Primary Examiner—Peter C. English

(57) ABSTRACT

A boot is disposed between two members movable relative to each other. The boot includes a plurality of contracting portions situated adjacent to each other. In an unloaded condition, the contracting portions extend in a longitudinal direction and are gradually offset in a lateral direction perpendicular to the longitudinal direction. In a contracted condition when at least one of the members moves toward the other member along the longitudinal direction, the contracting portions are overlapped with each other in the lateral direction.

10 Claims, 6 Drawing Sheets

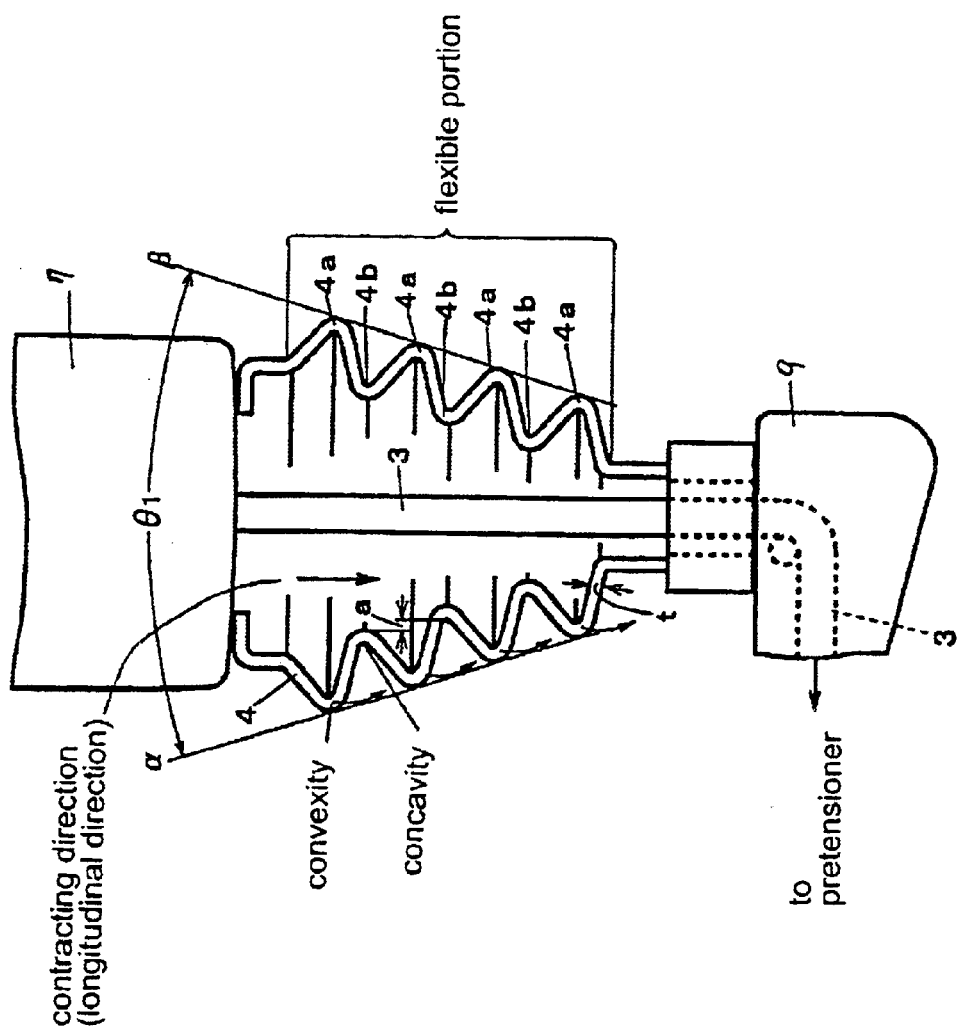

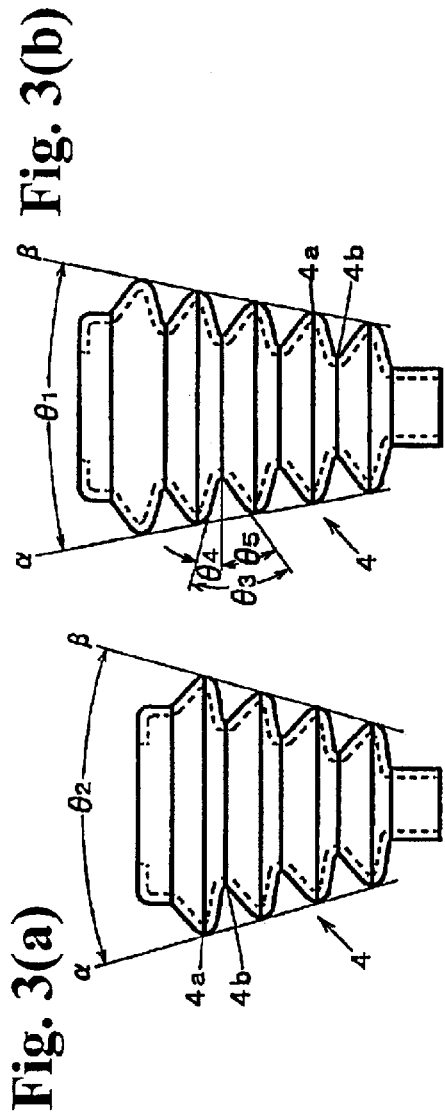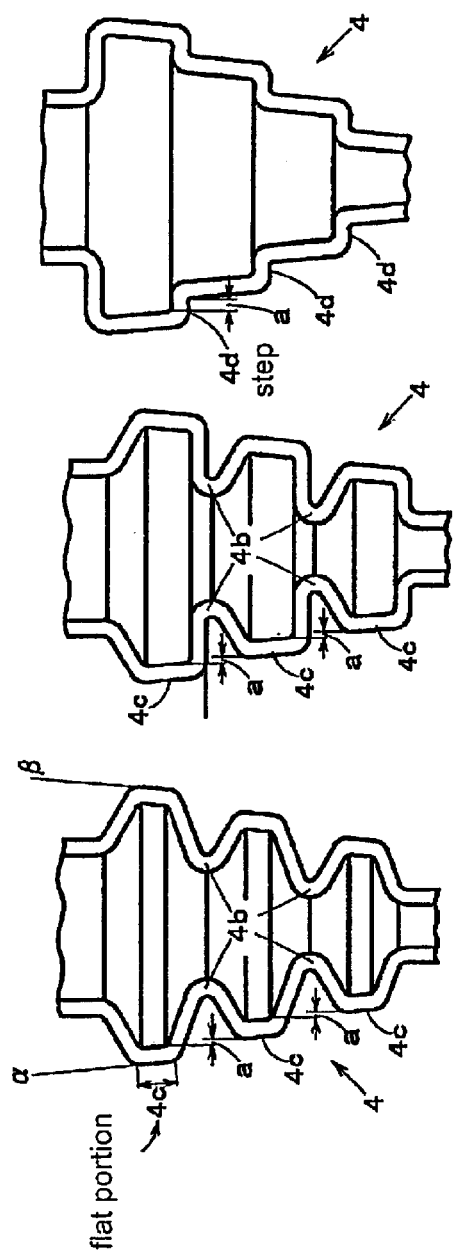

Fig. 4(f)
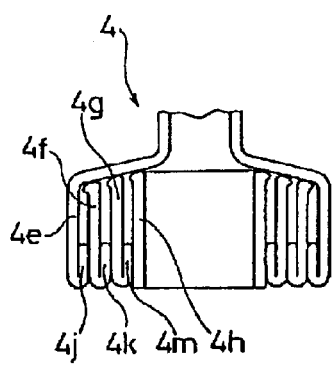
Fig. 4(e)
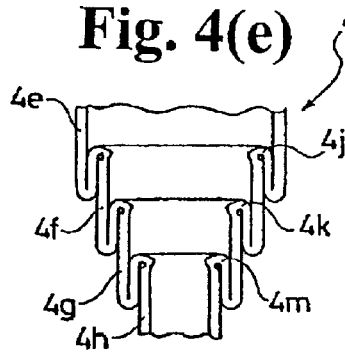
Fig. 4(c)
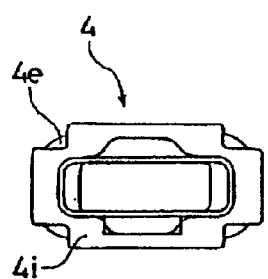
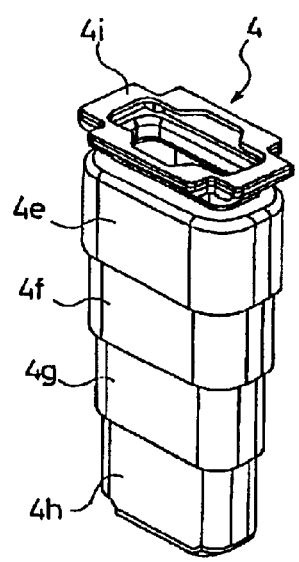
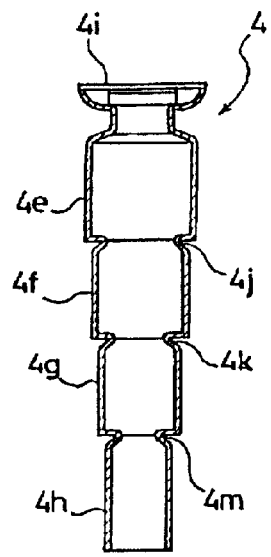
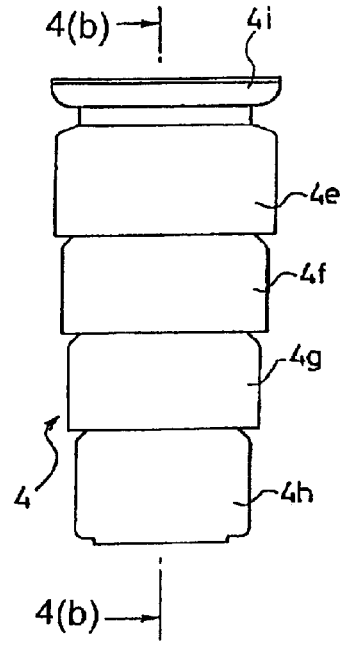
Fig. 4(d)  Fig. 4(b)  Fig. 4(a)

BOOT AND SEAT BELT DEVICE EMPLOYING THE SAME

BACKGROUND OF THE INVENTION AND RELATED ART STATEMENT

The present invention relates to a boot disposed between two members, movable relative to each other, such as a buckle of a seat belt device installed for a seat of a vehicle such as an automobile, and a buckle supporting member fixed to a vehicle body for movably supporting the buckle when necessary. The boot contracts at least when subjected to pressure exceeding a predetermined value. Also, the present invention relates to a seat belt device employing the boot.

Bellow-shaped boots capable of expansion and contraction have been conventionally disposed between two members that are movable relative to each other in an axial direction, thereby protecting a portion between the two members. Such boots are used in various applications like, for example, a seat belt device installed to a seat of a vehicle such as an automobile.

Generally, the seat belt device comprises a seat belt retractor, not shown here (but shown in FIG. 1 later), which is fixed to a vehicle body near a vehicle seat and normally accommodates a seat belt to allow the seat belt to retract and withdraw and to prevent the withdrawal of the seat belt in an emergency such as a vehicle collision to restrain and protect an occupant in the vehicle seat; the seat belt for restraining the occupant wearing the seat belt that extends from the seat belt retractor and whose end is connected to an anchor fixed to a portion of the vehicle body on an outer side of the vehicle seat; a buckle fixed to, for example, a portion of the vehicle body on an inner side of the vehicle seat; and a tongue that is slidably disposed to the seat belt and can be engaged with or released from the buckle. The seat belt is withdrawn to extend across the shoulder, chest, and lap of the occupant and the tongue is latched to the buckle, whereby the seat belt is worn by the occupant.

When the occupant wears the seat belt, in a normal state, the seat belt is lightly retracted by the seat belt retractor to fit the occupant's body to such an extent that the occupant does not feel pressure and in such a manner as to allow the retraction and withdrawal of the seat belt. In the event of emergency such as a vehicle collision at which large deceleration is exerted on the vehicle, the occupant tends to move forward due to a large inertia force. However, the seat belt is stopped from being withdrawn, thereby restraining and protecting the occupant.

Some conventional seat belt devices have a pretensioner that is activated in the case of emergency such as a vehicle collision to pull the seat belt, thereby improving the restraint performance and thus rapidly restraining the occupant with increased restraining force. The pretensioner is normally installed in the seat belt retractor, and in some cases installed to the buckle itself or to the anchor.

For example, in the case that the pretensioner is installed to the buckle, as shown in FIGS. 5(a), 5(b), a buckle 2 is supported by a buckle supporting member 1 that is fixed to a vehicle floor (not shown) in such a manner that the buckle 2 is movable relative to the buckle supporting member 1 in the longitudinal direction (the vertical direction in FIGS. 5(a), 5(b)). The buckle supporting member 1 and the buckle 2 are the two members movable relative to each other according to the present invention. One end of a wire 3 is connected to the buckle 2 and the other end of the wire 3 is connected to a piston of a buckle pretensioner (not shown). Generally, the buckle pretensioner is structured to generate high-pressure reaction gas as a result of a reaction of a reactant in the event of emergency such as a vehicle collision. The pressure of the reaction gas actuates the piston of the buckle pretensioner so as to pull the wire 3 with relatively large force.

Further, a boot 4 is arranged to cover the wire 3 between the buckle supporting member 1 and the buckle 2. The boot 4 is made of a resin or a rubber and formed in a cylindrical shape. In addition, the boot 4 has a bellow-shaped shrinkable portion composed of mountainous convexities and concavities with triangular cross sections. In this case, the cross sections (cut in a direction perpendicular to the longitudinal direction of the boot 4, not shown) of the shrinkable portion at the respective four triangular convexities (the number of concavities is three) have the same shape and dimension.

That is, in a vertical section shown in FIG. 5(a) passing through the center of a cross section of the boot 4, a straight line α in the longitudinal direction connecting the tops 4a of the convexities at one side (left side in FIG. 5(a)) and a straight line β in the longitudinal direction connecting the tops 4a of the convexities at the other side (right side in FIG. 5(a)) are parallel to each other. The boot 4 can freely expand and contract when it is not attached to the buckle.

In a normal state, the boot 4 is held in an expanded state as shown in FIG. 5(a). The buckle 2 is substantially fixed to the vehicle body by the wire through the boot 4. As the buckle pretensioner is actuated in the event of emergency such as a vehicle collision in the state that the seat belt is worn, i.e. the tongue is latched to the buckle, the wire 3 is pulled with the relatively large force as mentioned above, so that the boot 4 deforms in the longitudinal direction to contract as shown in FIG. 5(b). Therefore, the buckle 2 is moved toward the vehicle body (downward in FIGS. 5(a), 5(b)), thereby pulling the seat belt extending across the occupant and thus increasing the restraint force on the occupant by the seat belt.

To improve the restraint performance by the seat belt for the occupant in the event of emergency, the amount of the stroke movement of the buckle 2 upon the actuation of the buckle pretensioner is required as large as possible. For this purpose, the contraction amount in the longitudinal direction of the boot 4 must be made as large as possible.

However, in the aforementioned conventional boot 4, the convexities of the boot 4 contact each other to be overlapped in the contracting direction (the longitudinal direction) as shown in FIG. 5(b), thus the boot 4 can not contract further from this state. The maximum contraction amount of the boot 4 is limited by a length "a" of the overlapped convexities in the longitudinal direction. Therefore, the smaller the length "a" is, the larger the maximum contraction amount is. In addition, the length "a" is determined by a thickness "t" of the boot 4.

It is possible that the thickness "t" of the boot 4 is reduced in order to increase the contraction amount of the boot 4. However, the reduction in thickness "t" results in lower strength of the boot 4. That is, there is a limit of reducing the thickness "t". Accordingly, the reduction in the thickness "t" of the boot 4 will not result in a large increase in the contraction amount of the boot 4.

As mentioned above, the aforementioned conventional boot 4 has a problem that there is a limit of increasing the maximum contraction amount. Accordingly, there is a limit of increasing the stroke of the buckle 2, and it is thus impossible to greatly improve the restraint performance for the occupant by the buckle pretensioner.

Further, in the case of the pretensioner installed to the anchor, there is also a limit of increasing the maximum amount of the boot contraction in the same manner as the aforementioned case of the buckle pretensioner. Accordingly, there is a limit of pulling the seat belt and it is thus very difficult to greatly improve the restraint performance by the anchor pretensioner for the occupant.

The present invention has been made under the aforementioned circumstances and the object of the present invention is to provide a boot, wherein the maximum contraction amount can be more effectively set to be larger and the boot has a predetermined strength.

Another object of the present invention is to provide a seat belt device with the improved restraint performance for the occupant because the maximum contraction amount of the boot is more effectively set to be larger and the boot does not interfere the restraint performance.

Further objects and advantages of the invention will be apparent from the following description of the invention.

SUMMARY OF THE INVENTION

To solve the aforementioned problems, a boot according to the first aspect of the invention is disposed between two members, movable relative to each other, and has a flexible portion that contracts when at least one of the members moves to toward the other member, wherein the flexible portion is structured such that sections composing the flexible portion are overlapped with each other during its contraction, and the overlapping direction is perpendicular to the contracting direction.

In the boot according to the second aspect of the invention, the flexible portion is structured such that a cross section of the flexible portion perpendicular to the contraction direction of the flexible portion becomes smaller from one of the members toward the other.

In the boot according to the third aspect of the invention, the flexible portion has convexities and concavities and is structured such that a cross section of the convexity perpendicular to the contraction direction of the flexible portion becomes smaller from one of the members toward the other.

In the boot according to the fourth aspect of the invention, the flexible portion contracts in a telescope-like manner.

In the fifth aspect of the invention, a seat belt device comprises a seat belt; a seat belt retractor for winding up the seat belt for the retraction and withdrawal of the seat belt; an anchor for fixing an end of the seat belt extending from the seat belt retractor to a portion of the vehicle body; a tongue slidably disposed to the seat belt; and a buckle supported by a buckle supporting member fixed to the vehicle body and to which the tongue is latched. Further, the boot as described in one of the first through fourth aspect is disposed between the buckle and the buckle supporting member and/or between the anchor and the end of the seat belt.

In the boot of the present invention having the aforementioned structure, when at least one of two members moves closer to the other, the boot contracts in such a manner that parts composing a flexible portion thereof are overlapped with each other in the direction perpendicular to the contracting direction. Therefore, the boot can contract over a large range regardless of the overlapped parts of the flexible portion, i.e. a thickness of the boot. Accordingly, the maximum contraction amount of the boot can be larger than that of the coventional boot where parts of the flexible portion are overlapped in the contracting direction. In addition, since the boot can contract independently from the thickness of the boot, the wall of the boot can be made to have a specific thickness, thus providing a specific strength.

According to the seat belt device of the present invention, the stroke or movement of at least one of the buckle and the anchor-side end of the seat belt can be increased because the maximum contraction amount of the boot is increased. That is, the maximum stroke or movement of at least one of the buckle and the end of the seat belt to be connected to the anchor can be increased.

Because of the increase in the maximum stroke of the buckle or the anchor-side end of the seat belt, the seat belt extending across the occupant can be pulled further, thereby effectively increasing the restraint force to the occupant by the seat belt and thus significantly improving the restraint performance of the seat belt as compared to the conventional one.

BRIEF DESCRIPTION OF THE DRAWINGS

FIGS. 3(*a*)–3(*e*) are views showing modifications of the boot according to the present invention;

FIGS. 4(*a*)–4(*f*) show other embodiments of the boot according to the present invention, wherein FIG. 4(*a*) is a front view thereof, FIG. 4(*b*) is a sectional view taken along line 4(*b*)–4(*b*) of FIG. 4(*a*), FIG. 4(*c*) is a plan view thereof, FIG. 4(*d*) is a perspective view thereof, FIG. 4(*e*) is an illustration partially showing the boot in the contracted sate, and FIG. 4(*f*) is an illustration partially showing the boot in the contracted sate.

DETAILED DESCRIPTION OF PREFERRED EMBODIMENTS

Figure 1:
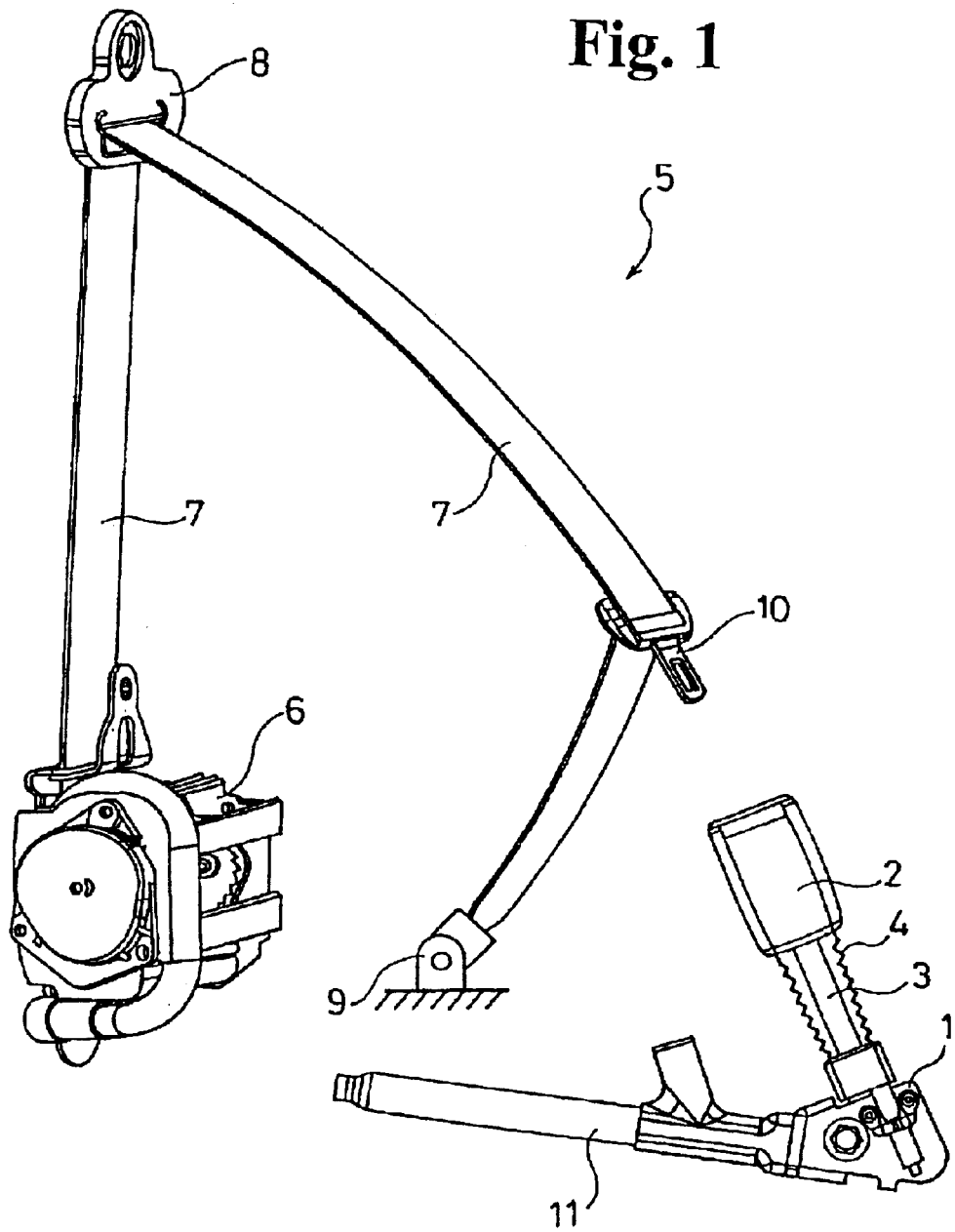
FIG. 1 is an illustration schematically showing a seat belt device employing a boot of an embodiment of the present invention.

Hereinafter, embodiments of the present invention will be described with reference to the attached drawings. FIG. 1 is an illustration schematically showing a seat belt device employing a boot of an embodiment of the present invention. Elements of the following embodiment similar or corresponding to the elements of the conventional example will be marked by the same reference numerals and the detail description of the elements will be omitted.

As shown in FIG. 1, a seat belt device 5 of this embodiment comprises a seat belt retractor 6 fixed to a portion of a vehicle body such as a vehicle floor and the like; a conventionally known belt guide 8 attached to a portion of the vehicle body such as a center pillar and the like for guiding a seat belt 7 extending from the seat belt retractor 6 into a predetermined position relative to an occupant; an anchor 9 fixed to a portion of the vehicle body such as a floor and the like on an outer side of a vehicle seat and to which an end of the seat belt 7 is connected; a conventionally known tongue 10 slidably supported to the seat belt 7; a conventionally known buckle 2 fixed to a portion of the vehicle body such as a floor and the like on an inner side of the vehicle seat and to which the tongue 10 can be latched; a buckle supporting member 1 for supporting the buckle 2 in the same manner as the conventional example described above; a boot 4 disposed between the buckle 2 and the buckle supporting member 1 in the same manner as mentioned above; and a buckle pretensioner 11 that is to be activated in the case of emergency such as a vehicle collision to pull the seat belt via a wire 3 in the same conventional manner as mentioned above.

The seat belt retractor 6 may be a conventionally known emergency locking type retractor (ELR), a conventionally known ELR with a pretensioner, or a conventionally known seat belt retractor with a load limiter that is to be actuated in the event of emergency to limit the load on the seat belt 7 in order to absorb impact energy.

The pretensioner 11 may be a type of generating high-pressure reaction gas as a result of the reaction of a reactant in the event of emergency such as a vehicle collision such that the buckle 2 is pulled toward the buckle supporting member 1 by the pressure of the reaction gas. It should be noted that the pretensioner 11 may be any other conventionally known devices.

Figure 2B:
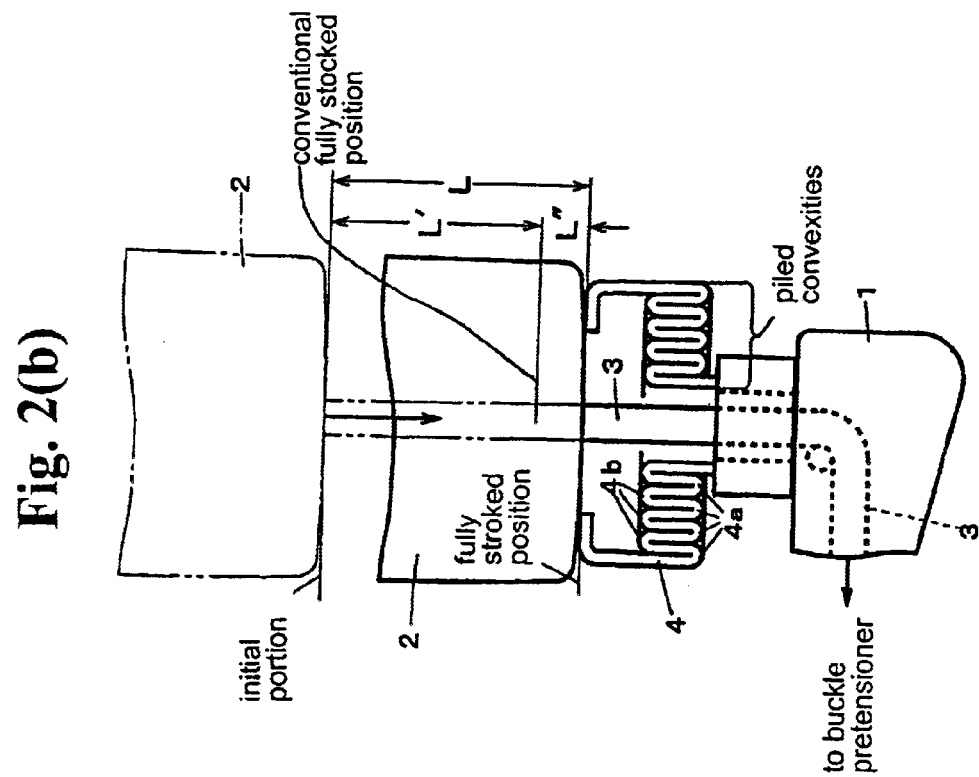
FIGS. 2(*a*), 2(*b*) and 2(*c*) are enlarged views of a part including the boot shown in a vertical section, wherein FIG. 2(*a*) is a view showing a normal state where the boot does not contract, FIG. 2(*b*) is a view showing a state where the boot contracts, and FIG. 2(*c*) is a view showing a state, similar to FIG. 2(*a*), where the part including the boot is located between an anchor and one end of a seat belt.
Figure 2A:
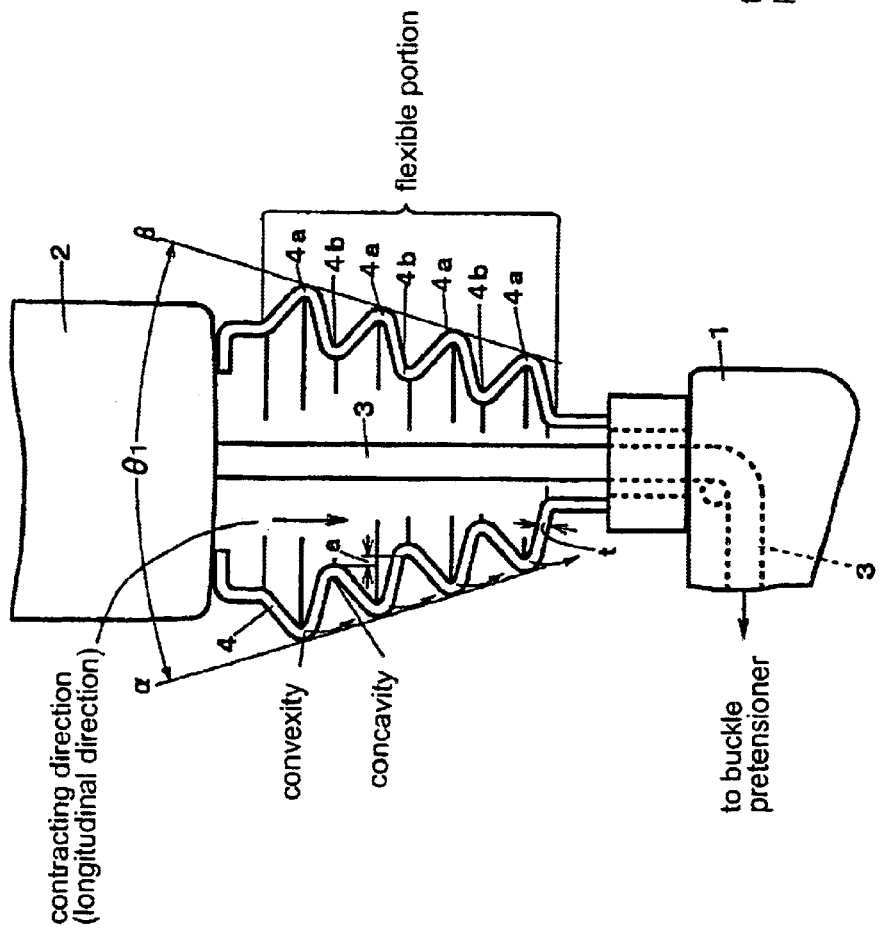
Figure 5B:
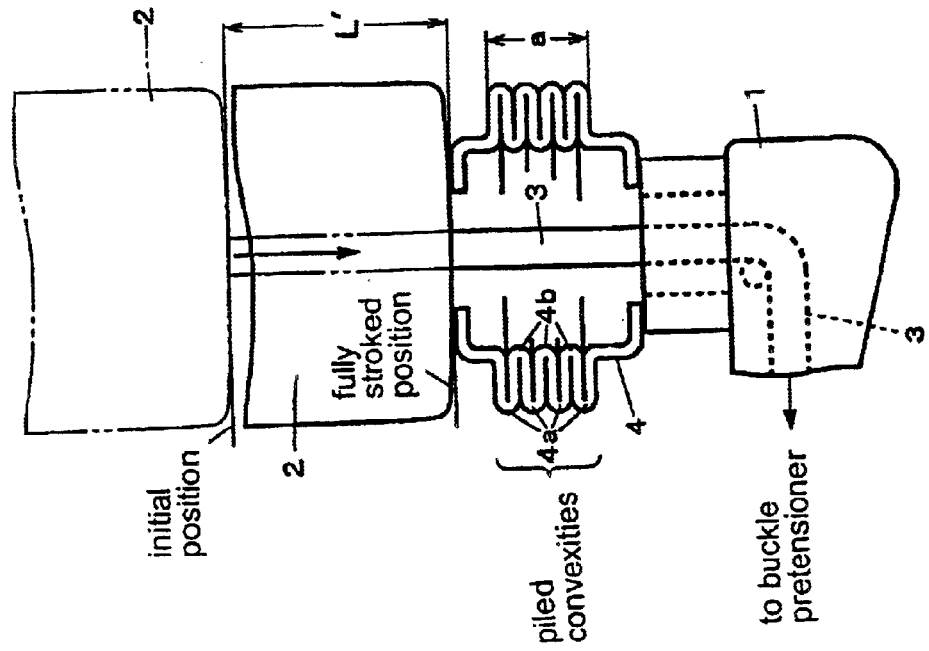
FIGS. 5(*a*) and 5(*b*) show a conventional boot used in a seat belt device, wherein FIG. 5(*a*) is a view showing the normal state where the boot does not contract and FIG. 5(*b*) is a view showing the state where the boot contracts.
Figure 5A:
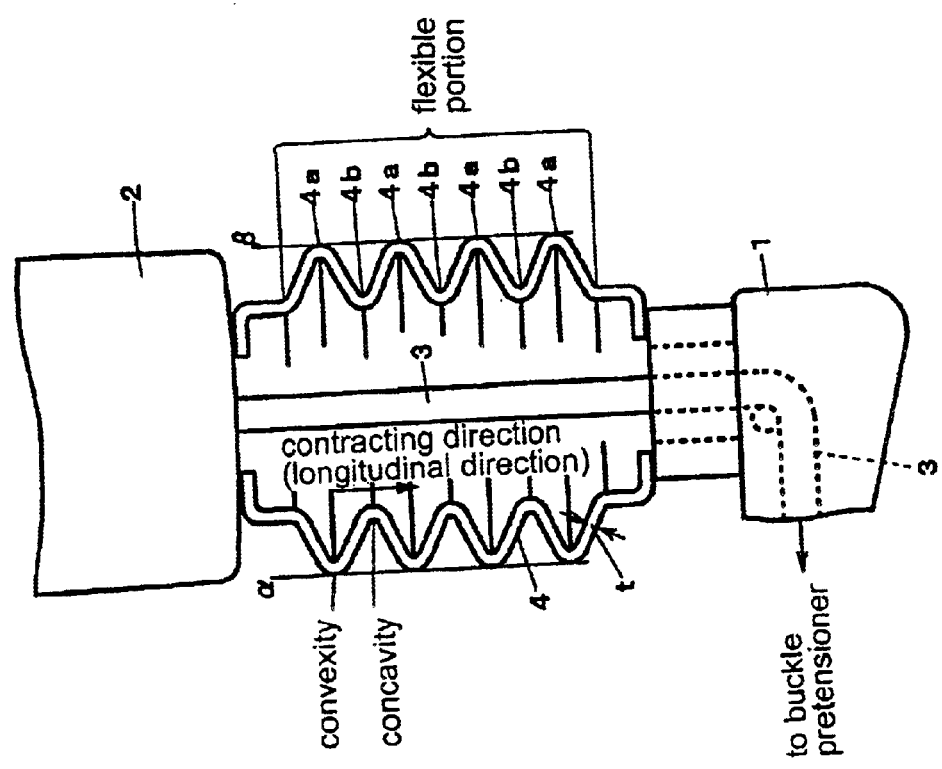

The boot 4 is made of a resin such as polypropylene and polyethylene or a rubber and formed in a cylindrical shape. In addition, similarly to the aforementioned conventional boot, the boot 4 has a bellow-like flexible portion composed of mountainous convexities and concavities, cross sections of which are triangular. In this case, the boot 4 is configured in such a manner that shapes of the cross sections at the tops 4a of the convexities (cross sections in a direction perpendicular to the longitudinal direction or the contracting direction of the boot 4) are similar and become smaller by a constant ratio from the convexity at the buckle 2 side toward the convexity at the buckle supporting member 1 side. That is, as shown in FIG. 2(a), the straight lines α and β as mentioned above connecting the tops 4a of the convexities of the boot 4 form two sides, other than a base, of an inverse isosceles triangle, respectively, so that the distance therebetween becomes larger toward the buckle 2 (toward the upper side in FIG. 2(a)). In this case, as shown in FIG. 2(a), an inner wall of the bottom 4b of one concavity is shifted toward the center of the boot 4 from an outer wall of the bottom 4b of the next concavity (the lower next concavity) by a predetermined amount "a" (the same for the other concavities).

In a usual state, the boot 4 is held in an expanded state as shown in FIG. 2(a) similarly to the aforementioned conventional example. The buckle 2 is substantially fixed to the vehicle body by the wire 3 through the boot 4. As the buckle pretensioner 11 is actuated in the event of emergency such as a vehicle collision while the seat belt is worn, i.e. the tongue 10 is latched to the buckle 2, the wire 3 is pulled with a relatively large force as mentioned above so that the boot 4 is deformed in the longitudinal direction to contract.

At this point, since the flexible portion if the boot 4 has such a profile that the width becomes wider toward the buckle 2, i.e. the upper side, the force pressing the boot downward in FIG. 2(a) by the buckle 2 produces moment that acts on the respective convexities in arrow directions or out-downward directions of the boot 4. By the moment, the convexities of the flexible portion deform and bend sequentially, resulting in that the convexities are overlapped with each other in the lateral direction (the right and left directions in FIG. 2(b)) perpendicular to the contracting direction (the longitudinal direction) as shown in FIG. 2(b).

In this case, th outer wall of the bottom 4b of the concavity is shifted toward the inside of the boot 4 from the inner wall of the bottom 4b of the upper next concavity by the predetermined value "a" as shown in FIG. 2(a), thereby facilitating the deformation of the boot 4 to bend and thus resulting in the smooth contraction of the boot 4.

That is, since the convexities are overlapped with each other in the lateral direction perpendicular to the contracting direction, the boot 4 can greatly contract in the longitudinal direction with little influence from the overlapped height of the convexities of the boot 4 (i.e. the thickness "t" of the boot 4), whereby the maxim contraction amount of the boot 4 is increased as compared to the aforementioned conventional example. Accordingly, the maximum stroke "L" of the buckle 2 becomes longer than the maximum stroke "L" of the conventional buckle 2 by an amount "L". In addition, since the thickness "t" of the boot 4 does not affect the contraction of the boot 4, the boot 4 can be made to have a specific thickness, thus providing a specific strength.

Therefore, when the boot 4 is applied to the buckle 3, the smooth movement or stroke of the buckle 2 is achieved and the maximum stroke "L" of the buckle 2 is increased, whereby the seat belt 7 extending across the occupant can be strongly pulled. Thus, this effectively increases the restraint force on the occupant by the seat belt 7, significantly improving the restraint performance of the seat belt 7 as compared to the conventional example. FIG. 2(c) shows an embodiment where the seat belt 7 is attached to the anchor 9, similar to FIG. 2(a).

FIGS. 3(a)–3(e) show modifications of the boot 4 according to the present invention. In a modification shown in FIG. 3(a), an angle $\theta_2$ defined by the two straight lines α, β is set to be greater than the angle $\theta_1$ defined by the two straight lines α, β of the aforementioned embodiment. Since the angle $\theta_2$ defined by the straight lines α, β is set to be greater ($\theta_2 > \theta_1$), it becomes easier for the convexities of the flexible portion to be deformed, and soft and smooth contraction can be obtained. Alternatively, an angle defined by the two straight lines α, β can be set to be smaller (not shown) than the angle $\theta_1$ defined by the two straight lines α, β of the aforementioned embodiment. In this case, it becomes harder for the convexities of the flexible portion to be deformed and hard contraction is obtained.

By suitably adjusting the angle defined by the straight lines α, β, various contraction characteristics can be obtained. When applied to the buckle 2, the boot 4 can fit to various sizes of the buckle 2 and can provide various restraint properties.

In a modification shown in FIG. 3(b), the number of convexities of the flexible portion is five and greater than that of the convexities in the aforementioned embodiment. Increase in number of the convexities increases the contraction amount of the boot 4, thus increasing the stroke of the buckle 2. Therefore, the restraint performance by the seat belt 7 is further improved. Alternatively, the number of the convexities of the flexible portion can be set to be smaller than the number of the convexities of the aforementioned embodiment, but this variation is not illustrated. In this case, the contraction amount of the flexible portion is reduced.

By suitably setting the number of the convexities, the contraction characteristics with various contraction amounts can be obtained. The boot 4 has advantages when applied to the buckle 2 that the boot 4 can fit to various distances between the buckle 2 and the buckle supporting member 1 and can provide restraint properties with various restraint forces.

Further, in a modification shown in FIG. 3(c), one convexity has a flat portion 4c formed by cutting the top 4a of the convexity along the straight lines α, β. The presence of the flat portion 4c improves the strength of the boot 4. When the boot 4 is applied to the buckle 2, the buckle 2 can be more firmly supported by the buckle supporting member 1. In addition, the convexities next to the above convexities (the convexities immediately above the convexities in the drawing) also has flat portions 4c formed by cutting the tops 4a thereof along the straight lines, which are parallel to the straight lines α, β, respectively.

In this case, the lower flat portion 4c is shifted from the upper next flat portion 4c in such a manner that the outermost portion of the outer wall of the lower flat portion 4c is shifted toward the center of the boot 4 from the innermost portion of the inner wall of the upper next flat portion 4c by a predetermined value "a" (the same for the others). It should be noted that the outermost portion means a portion furthermost from the center of the boot 4 and the innermost portion means a portion closest to the center of the boot 4. That is, the outer walls of the flat portions 4c are shifted inwardly (toward the center) of the boot 4 from the inner walls of the upper next flat portions 4c so that the flat portions 4c closest to the buckle supporting member 1 are closest to the center of the boot 4.

This arrangement that the flat portions 4c are sequentially shifted inwardly by the predetermined value "a" improves the strength of the boot 4, and yet facilitates the bending deformation of the boot 4, thus achieving the smooth contraction of the boot 4. When the boot 4 is applied to the buckle 2, the buckle 2 can stroke or move more smoothly, thereby improving the restraint performance of the seat belt 7. The other effects of the boot 4 and the case that the boot 4 of this modification is applied to the buckle 2 similar to the above embodiments are the same as those of the aforementioned embodiments.

In the aforementioned embodiments, the angle $\theta_3$ of each concave of the flexible portion is set such that the upper wall (in the drawings) of the concave is inclined upwardly by an angle $\theta_4$ relative to the bottom 4b and the lower wall (in the drawings) of the concave is inclined downwardly by an angle $\theta_5$ relative to the bottom 4b as shown in FIG. 3(b). However, in a modification shown in FIG. 3(d), the upper wall of each concave extends horizontally relative to the bottom 4b (that is, $\theta_4=0$). It should be noted that the lower wall of each concave may extend horizontally relative to the bottom 4b (that is, $\theta_5=0$)

This arrangement further facilitates the bending deformation of the boot 4, thereby improving the contraction property of the boot 4 as compared to the modification shown in FIG. 3(c). The other effects of the boot 4 and the case that the boot 4 of this modification is applied to the buckle 2 similarly to the aforementioned embodiments are the same as those of the embodiment of FIG. 3(d).

In any one of the aforementioned embodiments, the flexible portion is composed of the convexities and concavities. In an embodiment shown in FIG. 3(e), the flexible portion is composed of a predetermined number of steps 4d, not convexities and concavities. In this case, the steps 4d are structured so as to be dented inwardly of the boot 4 as the position becomes closer to the buckle supporting member 1. The other effects of the boot 4 of this embodiment and the case that the boot 4 of this embodiment is applied to the buckle 2 similarly to the aforementioned embodiments are substantially the same as those of the modification in FIG. 3(d).

In any of the aforementioned embodiments, the cross section of the cylindrical boot 4 is not illustrated and may be any desired shape, for example, circular, elliptical, oval-shaped, triangular, rectangular, pentagonal or polygonal. In addition, the vertical section of the flexible portion of the boot 4 may have such a shape that the straight lines α, β form two sides, besides a base, of an orthodox isosceles triangle, respectively, so that the distance therebetween reduces toward the buckle 2.

FIGS. 4(a)–4(f) show another embodiment of a boot according to the present invention, wherein FIG. 4(a) is a front view thereof, FIG. 4(b) is a sectional view taken along line 4(b)—4(b) of FIG. 3(a), FIG. 4(c) is a plan view thereof, and FIG. 4(d) is a perspective view thereof. Elements of the following embodiment similar or corresponding to those of the conventional example will be marked by the same reference numerals and the detail description of the elements will be omitted.

In any of the aforementioned embodiments, the outer surface of the boot 4 is inclined relative to the longitudinal direction of the boot 4, for example, extending along the straight lines α, β. However, in this embodiment, the outer surface of the boot 4 extends parallel to the longitudinal direction. The boot 4 of this embodiment has a flexible portion composed of four contraction pieces, 4e, 4f, 4g and 4h. The shapes of the contraction pieces 4e, 4f, 4g, 4h are similar to each other and rectangle with chamfered corners. In this case, the contraction piece 4e at the uppermost position in the drawings has the largest cross section, and the cross section becomes smaller in the order of 4f, 4g, 4h toward the buckle supporting member 1. The contraction pieces 4f, 4g, 4h are allowed to be folded into the upper next contraction pieces 4e, 4f, 4g, respectively. The uppermost contraction piece 4e is connected to the buckle 2 via a buckle joint 4i formed on its upper end. The lower end of the lowermost contraction piece 4h is connected to the buckle supporting member 1.

The lower peripheral edge of the uppermost contraction piece 4e and the upper peripheral edge of the next contraction piece 4f are connected to each other by an annular joint piece 4j. The lower peripheral edge of the contraction piece 4f and the upper peripheral edge of the next contraction piece 4g are connected to each other by an annular joint piece 4k. Further, the lower peripheral edge of the contraction piece 4g and the upper peripheral edge of the next contraction piece 4h are connected to each other by an annular joint piece 4m.

Also in the boot 4 of this embodiment, the contraction pieces 4e, 4f, 4g, 4h, the buckle joint 4i, and the joint pieces 4j, 4k, 4m are made of a resin such as polypropylene and polyethylene or rubber and formed integrally. In a usual state, the boot 4 is held in the full expansion state as shown in FIG. 4(b). Similarly to the aforementioned embodiments, the boot 4 is applied to the buckle 2 of the seat belt device 5 in such a manner that the buckle joint 4i is connected to the buckle 2 and the lower end of the lowermost contraction piece 4h is connected to the buckle supporting member 1. It should be noted that the wire 3 connecting the buckle 2 and the buckle pretensioner 11 passes through the boot 4, but an illustration is omitted.

In the boot 4 applied to the buckle of the seat belt device 5, the buckle pretensioner 11 is actuated in the event of emergency such as a vehicle collision so that the buckle 2 is pulled toward the buckle supporting member 1 with relatively large force by the wire 3 in the same manner as mentioned above. Therefore, the boot 4 is pressed with a large force by the buckle 2. Then, as shown in FIG. 4(e), the joint pieces 4j, 4k, 4m are bent inwardly so that the contraction pieces 4f, 4g, 4h partially enter into the upper next contraction pieces 4e, 4f, 4g, respectively. That is, the boot 4 of this embodiment contracts in a telescope-like manner.

Similarly to the aforementioned embodiment, also in the boot 4 of this embodiment, the contraction pieces are overlapped with each other in the direction perpendicular to the contracting direction (the longitudinal direction of the boot 4). Therefore, the boot 4 can greatly contract in th longitudinal direction regardless of the thickness of the boot 4, thereby effectively increasing the stroke or movement of th buckle 2 and improving the restraint performance for the occupant by the seat belt 7 in the event of emergency.

As shown in FIG. 4(f), the joint pieces 4j, 4k, 4m may be bent inwardly and broken. In this case, the contraction pieces 4f, 4g, 4h substantially entirely enter into the upper next contraction pieces 4e, 4f, 4g, respectively, thereby increasing the contraction amount of the boot 4.

The other effects of the boot 4 of this embodiment and the other effects in the case that the boot 4 of this embodiment is applied to the buckle 2 similarly to the aforementioned embodiment are substantially the same as those of the previous embodiments.

Though the cross sections of the contraction pieces 4e, 4f, 4g, 4h are set to be rectangular in the aforementioned embodiment, the cross sections of the contraction pieces 4e, 4f, 4g, 4h are not limited thereto and may be any desired shape, for example, circular, elliptical, oval-shaped, triangular, rectangular, pentagonal or polygonal.

The contraction pieces 4e, 4f, 4g, 4h may be structured such that the lowermost contraction piece 4h (closest to the buckle supporting member 1) has the largest cross section and the cross section becomes smaller upwardly (toward the buckle 2), to the contrary to the aforementioned embodiments in FIGS. 4(a) and 4(b).

In any of the aforementioned embodiments, the boot 4 is disposed on the buckle 2 of the seat belt device 5. However, the boot 4 of the present invention can be disposed between two members, movable relative to each other, such as an anchor for the seat belt device 5. Moreover, the boot 4 of the present invention can be applied to any device, other than the seat belt device 5, having two members movable relative to each other.

As apparent from the above description, according to the boot of the present invention, when at least one of the two members comes closer to the other, the boot contracts in such a manner that parts composing the flexible portion thereof are overlapped with each other in the direction perpendicular to the contracting direction. Therefore, the boot can contract largely with little influence from the overlapped parts of the flexible portion, i.e. the thickness of the boot. Accordingly, the maximum contraction amount of the boot can be large than that of the conventional boot in which parts of the flexible portion are overlapped in the contracting direction.

In addition, since the boot can contract regardless of the thickness t of the boot, the boot can be made to have a specific thickness, thus providing a specific strength.

Further, according to the seat belt device of the present invention, the stroke or movement of at least either of the buckle and the anchor-side end of the seat belt can be increased because the maximum contraction amount of the boot is increased. Because of the increase in the maximum stroke of the buckle, the seat belt extending across the occupant can be further largely pulled, thereby effectively increasing the restraint force to the occupant by the seat belt and thus significantly improving the restraint performance by the seat belt as compared to the conventional one.

While the invention has been explained with reference to the specific embodiments of the invention, the explanation is illustrative and the invention is limited only by the appended claims.

What is claimed is:

1. A boot disposed between two members movable relative to each other, comprising, a plurality of contracting portions integrally formed together to be situated adjacent to each other, said contracting portions including hollow pieces extending in an axial direction and having cross sections gradually becoming smaller laterally inwardly perpendicular to the axial direction by a predetermined ratio from one hollow piece to another hollow piece adjacent thereto, and joint pieces extending laterally inwardly for connecting two of the hollow pieces adjacent to each other, said contracting portions, in an unloaded condition, extending in the axial direction and being gradually offset in a lateral direction perpendicular to the axial direction at the joint pieces, and in a contracted condition when at least of the members moves toward the other member along the axial direction, being overlapped with each other in the lateral direction.

2. A boot according to claim 1, wherein each of the joint pieces has an annular inwardly projecting portion in the unloaded condition, each said annular inwardly projecting portion extending inwardly beyond two hollow pieces connected by the respective joint piece.

3. A boot according to claim 2, wherein said contracting portions are flexible so that when the at least one of the members moves toward the other member, the joint pieces are bent inwardly and located inside the hollow pieces.

4. A seat belt device disposed in a vehicle, comprising:

a seat belt, a seat belt retractor attached to one end of the seat belt for winding up the seat belt and fixed to the vehicle, an anchor fixed to the vehicle and connected to the other end of the seat belt, a tongue slidably attached to the seat belt, a buckle supporting member fixed to the vehicle, a buckle attached to the buckle supporting member to engage the tongue, and a boot disposed on at least one of a portion between the buckle and the buckle supporting member, and a portion between the anchor and the other end of the seat belt, said boot including a plurality of contracting portions situated adjacent to each other, said contracting portions, in an unloaded condition, extending in a longitudinal direction and being gradually offset in a lateral direction perpendicular to the longitudinal direction, and in a contracted condition when the buckle or the other end of the seat belt moves toward the buckle supporting member or the anchor along the longitudinal direction, being overlapped with each other in the lateral direction.

5. A seat belt device according to claim 4, further comprising a pretensioner with a wire disposed inside the boot.

6. A seat belt device according to claim 4, wherein said contracting portions of the boot have lateral tops gradually offset toward a center of the boot by a predetermined ratio.

7. A seat belt device according to claim 4, wherein said contracting portions of the boot have convexities an concavities, said convexities being arranged to be smaller along the longitudinal direction by a predetermined ratio.

8. A seat belt device according to claim 7, wherein said convexities have tops, imaginary lines connecting the tops being inclined relative to the longitudinal direction.

9. A seat belt device according to claim 7, wherein said convexities and concavities have flat areas therebetween extending in the lateral direction.

10. A seat belt device according to claim 4, wherein said contracting portions have hollow pieces and joint pieces for connecting the hollow pieces, said hollow pieces having cross sections that gradually become smaller along the longitudinal direction by predetermined ratio so that the contracting portions contract telescopically.

* * * * *